United States Patent
Brannen et al.

(10) Patent No.: US 7,710,055 B2
(45) Date of Patent: May 4, 2010

(54) DC MOTOR VARIABLE KICK-START

(76) Inventors: Robert Alan Brannen, 900 N. Rural Rd., Apt 1018, Chandler, AZ (US) 85226; Jade H Alberkrack, 1834 E. Calle De Caballos, Tempe, AZ (US) 85284; Thomas Peter Bushey, 10440 E. Dennis St., Mesa, AZ (US) 85207

( * ) Notice: Subject to any disclaimer, the term of this patent is extended or adjusted under 35 U.S.C. 154(b) by 209 days.

(21) Appl. No.: 11/796,602

(22) Filed: Apr. 27, 2007

(65) Prior Publication Data
US 2008/0265811 A1 Oct. 30, 2008

(51) Int. Cl.
*H02P 1/04* (2006.01)

(52) U.S. Cl. .............. 318/400.09; 318/400.11; 318/272; 318/275

(58) Field of Classification Search ............ 318/400.09, 318/400.11, 272, 275, 268, 599; 388/800, 388/804, 806, 811, 814, 815
See application file for complete search history.

(56) References Cited

U.S. PATENT DOCUMENTS

| | | | |
|---|---|---|---|
| 5,254,914 A * | 10/1993 | Dunfield et al. | 318/400.34 |
| 5,396,159 A * | 3/1995 | Kaneda | 318/431 |
| 5,929,581 A * | 7/1999 | Van Brocklin et al. | 318/471 |
| 6,285,157 B1 * | 9/2001 | Hain et al. | 318/809 |
| 6,369,541 B1 * | 4/2002 | Albert | 318/560 |
| 6,414,843 B1 * | 7/2002 | Takeda | 361/687 |
| 6,639,371 B2 * | 10/2003 | Walters et al. | 318/400.11 |
| 6,737,860 B2 * | 5/2004 | Hsu et al. | 324/161 |
| 7,205,733 B2 * | 4/2007 | Xiong et al. | 318/400.11 |
| 2008/0240688 A1 * | 10/2008 | Alberkrack et al. | 388/811 |

FOREIGN PATENT DOCUMENTS

JP 05176567 A * 7/1993

* cited by examiner

*Primary Examiner*—Elvin G Enad
*Assistant Examiner*—Forrest M Phillips
(74) *Attorney, Agent, or Firm*—Knobbe Martens Olson & Bear LLP

(57) ABSTRACT

A method of operating a direct current motor fan assembly is provided in which a motor controller operates to apply full power to kick-start a motor to overcome static forces. As soon as a sensor determines that the motor has begun to rotate, the motor controller changes the motor drive level from full power to a predetermined lower level to maintain a desired rotational speed.

19 Claims, 2 Drawing Sheets

US 7,710,055 B2

DC MOTOR VARIABLE KICK-START

FIELD OF THE INVENTION

This invention pertains to motor controllers for direct current motors, in general, and to a control arrangement for start-up of direct current motors, in particular.

BACKGROUND OF THE INVENTION

It is common to use Pulse Width Modulation ("PWM") to control the speed of direct current, dc, motors that are utilized with fans in computer applications. Advantageously, PWM control provides for accurate motor speed control.

To reduce fan generated noise and also to reduce power consumption, most modern computers utilize fan controllers to respond to temperatures within the computer and to vary the speed of a fan to provide enough cooling to maintain a desired temperature.

Typically, the fan motor is not operated until such time as there is a need for cooling. It is desirable to be able to initially operate the fan at a low speed to provide cooling of slight temperature increases. However, the static friction of any motor is much higher than dynamic friction of the rotating motor. To assure quick starting of direct current fan motors, it is common to "kick-start" the motor by applying a dc current pulse of fixed time duration to get the rotor in motion and then switch to PWM signals that represent the desired motor rotational speed. The optimum period of the kick-start pulse is determined by the motor and the load inertia and is best determined experimentally as that which gives the most reliable starting performance. In many applications, the fan motor is run at full power for one second to assure that the static friction has been overcome and the motor is rotating.

The drawback to the kick-start is that fan is initially run at full speed and then slows down to the needed speed.

It is highly desirable to provide a motor controller arrangement that minimizes initial fan roar that occurs during timed kick-start operation.

SUMMARY OF THE INVENTION

In accordance with the principles of the invention, a method of operating a direct current motor fan assembly is provided in which a motor controller operates to apply full power to kick-start a motor to overcome static forces. As soon as a sensor determines that the motor has begun to rotate, the motor controller changes the motor drive level from full power to a predetermined lower level to maintain a desired rotational speed.

In the illustrative embodiment of the invention, the motor controller initially applies a 100% duty cycle PWM drive signal to the motor until the controller detects rotor movement by monitoring the output of a Hall effect sensor coupled to the motor and determining that rotor movement has occurred by a Hall sensor transition and once movement has been detected the motor controller changes the duty cycle to the a predetermined duty cycle.

An embodiment in accordance with the principles of the invention, is a monolithic brushless DC motor controller that comprises all of the required functions for implementing fan speed control. The motor controller contains a pulse width modulator (PWM) consisting of a fixed frequency oscillator, comparator and a latch for speed control, commutation logic for proper drive sequencing, a kick-start circuit and a Hall sensor transition detector.

In accordance with the principles of the invention the motor controller is formed on a single integrated circuit.

BRIEF DESCRIPTION OF THE DRAWING

The invention will be better understood from a reading of the following detailed description of the drawing in which like reference designators are used to identify like elements in the various drawing figures, and in which.

DETAILED DESCRIPTION

Figure 1:
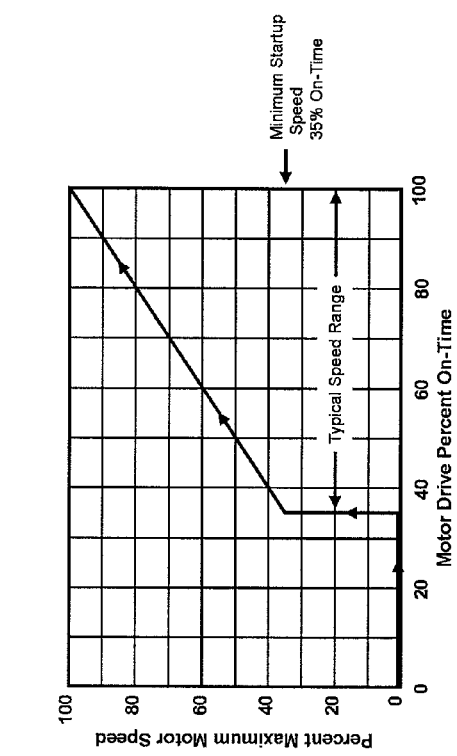
FIG. 1 illustrates in graph form startup characteristics of a dc motor of a type to which the principles of the invention may be advantageously applied.

FIG. 1 illustrates in graphical form the start-up characteristics of a dc motor of the type to which the present invention may be advantageously applied. It is a characteristic of such a motor that starting the motor from standstill is a demanding and complex process. At the instant of switching all the energy necessary to magnetize the motor, to provide the acceleration force, and to supply the kinetic energy of the rotor and load, must be present together with the energy to overcome the mechanical and electrical losses. The net effect of all the forces that must be overcome is that the motor does not begin to rotate until a predetermined drive level is applied to the motor-in this instance the minimum drive level to start the motor is 35% of full drive. Coincident with that predetermined drive level is that the minimum starting motor speed is a predetermined speed that in the illustrative embodiment is 35% of full speed. The typical operational speed range for a fan motor is from the minimum start up speed to 100% speed.

Figure 2:
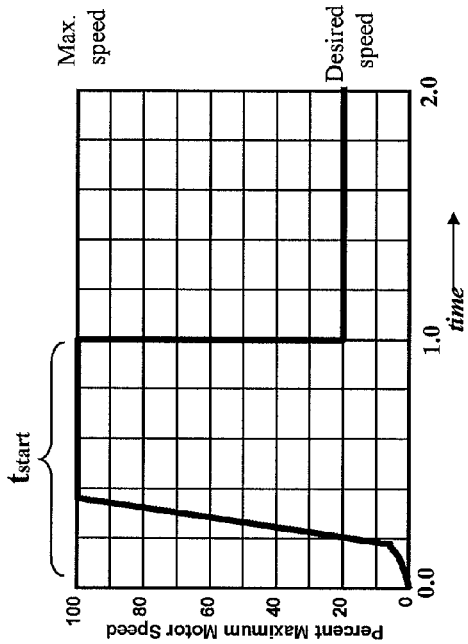
FIG. 2 illustrates in graph form typical kick-start run characteristics of the motor of FIG. 1.

To assure that motor start-up is not delayed, it is common to utilize a "kick-start" by applying full drive power to the motor for a predetermined fixed time period, for example, one second. As shown in FIG. 2, when full power is applied to the motor the, the motor speeds up to maximum speed. From the maximum speed, after the predetermined fixed time period, the motor speed is reduced to the desired motor speed.

Figure 3:
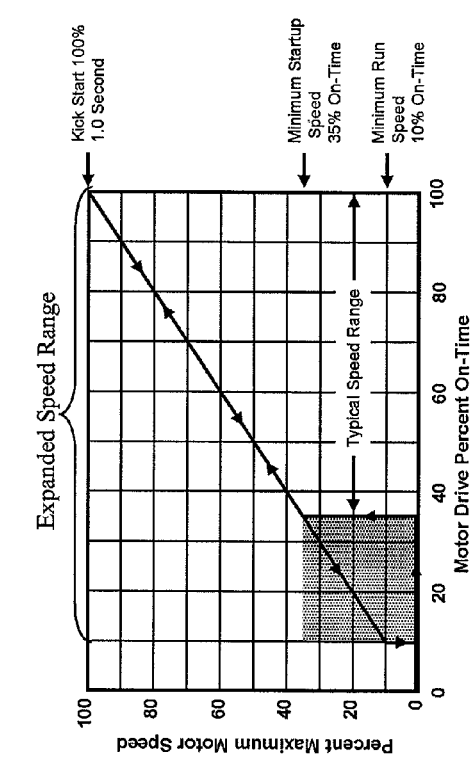
FIG. 3 is a graph illustrating operational ranges of a motor that has been started utilizing kick-start.

Advantageously, utilization of kick-start extends the useful low speed range from a typically minimum speed of 35% of maximum speed to a lower minimum speed after start up to, for example, 10% of maximum speed as shown in FIG. 3. Thus the use of kick-start allows fan system operation down to the minimum run speed thereby increasing the operating speed range. The lower speed operability allows for reduced acoustic noise.

However, the existing kick-start approach results in the motor reaching maximum speed before the kick-start time is completed. The result is that excessive motor and fan noise occur during kick-start. In addition, the motor speed drastically overshoots the desired final speed.

Figure 4:
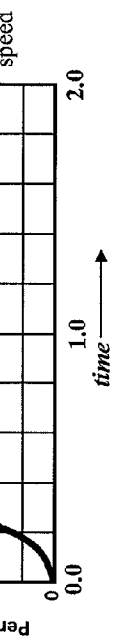
FIG. 4 illustrates a kick-start operation in accordance with the principles of the invention.

In accordance with the principles of the invention, when a motor is started, full power is applied to the motor as in the prior kick-start approach. However, rotor movement is monitored. When rotor movement is detected, the power is reduced immediately to the desired power level corresponding to the desired motor speed as shown in FIG. 4.

Rotor movement is detected in the illustrative embodiment by a Hall effect sensor signal transition. Upon detection of rotor movement the power applied to the motor immediately is changed from full power to a desired lower level to maintain a desired speed.

The motor reaches a desired speed before the kick-start fixed time period of the prior art arrangement is completed since the time is variable and dependent upon rotor movement. Advantageously, this eliminates excessive motor noise during kick-start and further, the motor speed most always does not overshoot the required final speed.

Figure 5:
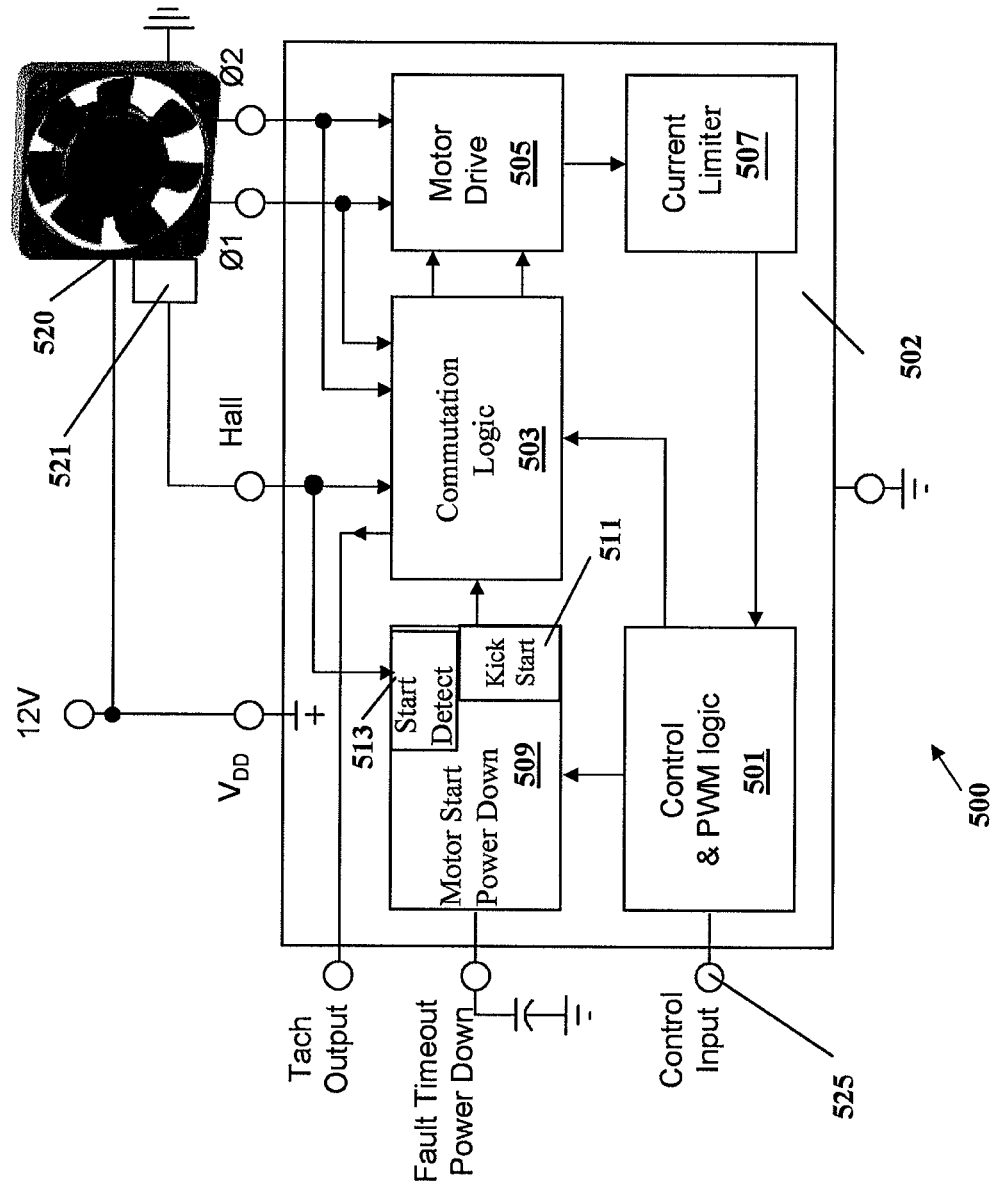
FIG. 5 illustrates a motor controller and fan in accordance with the principles of the invention.

The illustrative embodiment of the invention is a monolithic brushless DC motor controller 500 that provides functions for implementing fan speed control shown in FIG. 5.

Controller 500 for speed control of motor 520 includes control and PWM logic 501, commutation logic 503 for proper drive sequencing, motor drive 505, current limiter 507, and a programmable fault timer with time delayed restart and a power down low current mode block 509.

Controller 500, fully integrated on a single chip 502 contains all required functions for implementing fan speed control. Control and PWM logic 501 comprises a fixed frequency oscillator, comparator, and a latch along with associated gates for motor speed control of motor 520. Controller 500 also includes commutation logic 503 for proper drive sequencing, on-chip power MOSFETs for direct motor drive, cycle-by-cycle current limiting circuit, and circuit block 509 providing a programmable fault timer and a power down low current mode.

Motor drive 505 may include on-chip power MOSFETs for direct motor drive. Alternatively, motor drive 505 and/or the power MOSFETs may reside off of chip 502 in another embodiment of the invention.

Motor 520 includes a rotor and stator windings. A rotor sensor is provided with motor 520. In a typical motor fan arrangement, a Hall effect device sensor 521 is utilized. Motor 520 includes connections $\phi 1$, $\phi 2$, a sensor output indicated as Hall, power and ground connections.

Controller 500 utilizes pulse width modulation to provide an energy efficient means for controlling the motor speed of fan motor 520 by varying the average applied voltage to each stator winding during the commutation sequence.

Control of motor 520 is accomplished by applying a control signal indicative of a desired motor speed at the control input 525.

Commutation logic 503 includes a rotor position decoder coupled to Hall sensor 521. The rotor position decoder provides proper sequencing of the Phase 1, $\phi 1$, and Phase 2, $\phi 2$ drive outputs. Commutation logic 503 provides an output signal for monitoring the motor speed at output Tach.

Motor start logic 509 includes a kick-start circuit 511 that provides for applying maximum power to motor 520 when the fan motor is to be started. Kick-start circuit 511 determines that motor 520 has been in an off state and that a control signal applied to the control input 525 of controller 500 has been received that is indicative of a non-zero motor speed. Kick-start circuit 511 applies maximum power to motor 520 and also enables start detect logic 513. Start detect logic 513 monitors Hall effect sensor 521 and when it detects rotation, causes the kick-start circuit to be overridden and the control signal at the control input 525 that indicates the desired or indicated motor speed to control the fan motor.

The invention has been described in conjunction with a specific illustrative embodiment. It will be understood by those skilled in the art that various changes, substitutions and modifications may be made without departing from the spirit or scope of the invention. It is intended that all such changes, substitutions and modifications be included in the scope of the invention. It is not intended that the invention be limited to the illustrative embodiment shown and described herein. It is intended that the invention be limited only by the claims appended hereto, giving the claims the broadest possible scope and coverage permitted under the law.

What is claimed is:

1. A method of operating a direct current motor, the method comprising:
   Receiving, when a rotor of the motor is stationary, a signal indicating a desired rotational speed of the motor; applying full drive power to the motor; detecting initial movement of the rotor as the rotor begins to move from a stationary state; and
   reducing drive power to the motor from full drive power to a predetermined lower drive power to achieve the desired rotational speed immediately upon detecting the initial movement of the rotor without waiting for a predetermined fixed time period and without waiting for the rotor to move to a predetermined rotational position.

2. The method of claim 1, wherein said detecting initial movement of the rotor comprises:
   monitoring the output of a sensor coupled to the motor; and
   using the monitored output to determine when initial movement of the rotor occurs.

3. The method of claim 2, wherein the sensor comprises a Hall-effect sensor.

4. The method of claim 3, wherein the predetermined lower drive power corresponds to the desired rotational speed of the motor.

5. The method of claim 1, wherein the predetermined lower drive power corresponds to the desired rotational speed of the motor.

6. A method of operating a direct current fan motor for cooling electronic equipment, the method comprising:
   receiving, when the fan motor is stationary, a signal indicating a desired fan speed; applying full drive power to the fan motor after said receiving;
   detecting an initial rotation of the fan motor after said applying full drive power, wherein the fan motor begins to rotate from a stationary state; and
   immediately reducing drive power to the fan motor to a level corresponding to the desired fan speed in response to said detecting an initial rotation of the fan motor without waiting for a predetermined fixed time period and without waiting for the rotor to move to a predetermined rotational position.

7. The method of claim 6, further comprising driving the fan motor with pulse-width modulation logic.

8. The method of claim 7, wherein said detecting an initial rotation of the fan motor comprises:
   monitoring the output of a sensor coupled to the fan motor; and
   using the monitored output to detect the initial rotation of the fan motor.

9. The method of claim 8, wherein the sensor comprises a Hall-effect sensor.

10. A method of operating a controller for a direct current fan motor used to cool electronic equipment, the method comprising:
    receiving, at the controller and when the fan motor is stationary, a first signal indicating a desired fan speed;
    operating the controller to apply full drive power to the fan motor after said receiving a first signal;
    receiving a second signal at the controller, wherein the second signal indicates an initial rotation of the fan motor from a stationary position; and operating the controller to immediately reduce drive power to the fan motor from full drive power to a power level corresponding to the desired fan speed in response to said receiving a second signal, wherein the drive power is reduced without waiting for a predetermined fixed time period and without waiting for the rotor to move to a predetermined rotational position.

11. The method of claim 10, wherein the second signal is received from a sensor coupled to the fan motor.

12. A motor controller for a direct current motor, the motor controller comprising: a sensor configured to provide a first signal indicating an initial rotor movement of a motor that was stationary;
   an input terminal configured to receive a second signal indicating a desired speed of the motor;
   motor speed control circuitry, coupled to both the input terminal and the motor and configured to provide power to the motor;
   a kick-start circuit configured to cause the motor speed control circuitry to apply power to the motor when the second signal is received at the input terminal and the motor is stationary; and
   a start detect circuit coupled to both the sensor and the motor speed control circuitry, the start circuit configured to cause the motor speed control circuitry, to reduce power to the motor to a level corresponding to the desired speed immediately in response to receiving the first signal without waiting for a predetermined fixed time period and without waiting for the rotor to move to a predetermined rotational position.

13. The motor controller of claim 12, wherein the sensor comprises a Hall-effect sensor.

14. The motor controller of claim 12, wherein the motor speed control circuitry, the kick-start circuit, and the start detect circuit are formed on an integrated circuit.

15. The motor controller of claim 12, wherein the applied power is full drive power.

16. The motor controller of claim 12, wherein the start detect circuit comprises start detect logic configured to detect rotation of the motor.

17. The motor controller of claim 16, wherein the start detect logic is further configured to monitor a Hall-effect sensor.

18. A motor controller, comprising: means for receiving a signal indicating a desired speed; means for applying drive power to the motor after receipt of the signal; means for detecting an initial rotation of a rotor for the motor, wherein the initial rotation occurs when the rotor begins to move from a stationary state after the drive power has been applied; and
   means for reducing drive power to the motor to a level corresponding to the desired speed after detection of the initial rotation of the motor without wailing for a predetermined fixed lime period and without waiting for the rotor to move to a predetermined rotational position.

19. A method of operating a direct current motor, the method comprising:
   receiving a signal indicating a desired rotational speed of a motor having a rotor;
   applying drive power to the motor;
   detecting initial rotor movement caused by said applying drive power, wherein the initial rotor movement occurs when rotor movement begins from a stationary state of the rotor; and
   reducing drive power to the motor when initial rotor movement is detected, wherein the drive power is reduced without waiting for a predetermined fixed time period and without waiting for the rotor to move to a predetermined rotational position.

\* \* \* \* \*

UNITED STATES PATENT AND TRADEMARK OFFICE
CERTIFICATE OF CORRECTION

PATENT NO. : 7,710,055 B2  Page 1 of 1
APPLICATION NO. : 11/796602
DATED : May 4, 2010
INVENTOR(S) : Robert Alan Brannen et al.

It is certified that error appears in the above-identified patent and that said Letters Patent is hereby corrected as shown below:

In Column 4, Line 10, please delete "Receiving," and insert --receiving,--, therefor.

In Column 6, Line 17, please delete "wailing" and insert --waiting--, therefor.

In Column 6, Line 18, please delete "lime" and insert --time--, therefor.

Signed and Sealed this

Ninth Day of November, 2010

David J. Kappos
*Director of the United States Patent and Trademark Office*